US008291063B2

(12) United States Patent
Holland et al.

(10) Patent No.: US 8,291,063 B2
(45) Date of Patent: Oct. 16, 2012

(54) METHOD AND APPARATUS FOR COMMUNICATING BETWEEN AN AGENT AND A REMOTE MANAGEMENT MODULE IN A PROCESSING SYSTEM

(75) Inventors: Thomas Holland, Mountain View, CA (US); Mark W. Insley, Sunnyvale, CA (US); Pradeep Kalra, San Jose, CA (US); Peter Snyder, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 1203 days.

(21) Appl. No.: 11/073,342

(22) Filed: Mar. 4, 2005

(65) Prior Publication Data

US 2006/0200471 A1      Sep. 7, 2006

(51) Int. Cl.
    *G06F 15/173*      (2006.01)
(52) U.S. Cl. ........................................... 709/224
(58) Field of Classification Search ................. 709/223, 709/219, 224–227, 217; 714/2, 25, 47
    See application file for complete search history.

(56) References Cited

U.S. PATENT DOCUMENTS

| 4,670,880 | A | 6/1987 | Jitsukawa et al. |
| 5,241,549 | A | 8/1993 | Moon et al. |
| 5,555,438 | A | 9/1996 | Blech et al. |
| 5,664,101 | A | 9/1997 | Picache |
| 5,761,683 | A | 6/1998 | Logan et al. |
| 5,815,652 | A | 9/1998 | Ote et al. |
| 5,822,514 | A | 10/1998 | Steinz et al. |
| 5,881,078 | A | 3/1999 | Hanawa et al. |
| 6,170,067 | B1 * | 1/2001 | Liu et al. .................. 714/48 |
| 6,195,353 | B1 | 2/2001 | Westberg |
| 6,216,226 | B1 | 4/2001 | Agha et al. |
| 6,237,103 | B1 | 5/2001 | Lam et al. |
| 6,253,300 | B1 | 6/2001 | Lawrence et al. |
| 6,275,526 | B1 | 8/2001 | Kim |
| 6,335,967 | B1 | 1/2002 | Blomkvist et al. |
| 6,446,141 | B1 | 9/2002 | Nolan et al. |
| 6,480,850 | B1 | 11/2002 | Veldhuisen |
| 6,502,088 | B1 | 12/2002 | Gajda et al. |

(Continued)

FOREIGN PATENT DOCUMENTS

EP           0 621 706        10/1994

(Continued)

OTHER PUBLICATIONS

Phillips Semiconductors, The 12C Bus Specification, Jan. 2000, Version 2.1-2000, pp. 6, 7, 10, 13-15.

(Continued)

*Primary Examiner* — Chirag R Patel
(74) *Attorney, Agent, or Firm* — Perkins Coie LLP

(57) ABSTRACT

A processing system includes control circuitry to control the processing system, a remote management module to enable remote management of the processing system via a network, and an agent to operate as an intermediary between the remote management module and the control circuitry. The agent and the remote management module are configured to cooperatively implement an abstraction layer through which the agent and the remote management module communicate.

33 Claims, 12 Drawing Sheets

U.S. PATENT DOCUMENTS

| | | | |
|---|---|---|---|
| 6,502,208 B1 | 12/2002 | McLaughlin et al. | |
| 6,507,929 B1 | 1/2003 | Durham et al. | |
| 6,574,518 B1 | 6/2003 | Lounsberry et al. | |
| 6,586,911 B1 | 7/2003 | Smith | |
| 6,645,077 B2 | 11/2003 | Rowe | |
| 6,651,190 B1* | 11/2003 | Worley et al. | 714/43 |
| 6,690,733 B1 | 2/2004 | Baumgartner et al. | |
| 6,697,962 B1 | 2/2004 | McCrory et al. | |
| 6,728,908 B1 | 4/2004 | Fukuhara et al. | |
| 6,920,502 B2 | 7/2005 | Araujo et al. | |
| 6,925,531 B2* | 8/2005 | Konshak et al. | 711/114 |
| 6,976,058 B1 | 12/2005 | Brown et al. | |
| 7,003,563 B2 | 2/2006 | Leigh et al. | |
| 7,024,551 B2 | 4/2006 | King et al. | |
| 7,114,102 B2 | 9/2006 | Chan et al. | |
| 7,225,327 B1 | 5/2007 | Rasmussen et al. | |
| 7,234,051 B2 | 6/2007 | Munguia et al. | |
| 7,257,741 B1 | 8/2007 | Palenik et al. | |
| 7,466,713 B2 | 12/2008 | Saito | |
| 7,487,343 B1 | 2/2009 | Insley et al. | |
| 7,584,337 B2 | 9/2009 | Rowan et al. | |
| 7,805,629 B2 | 9/2010 | Insley et al. | |
| 7,865,606 B1* | 1/2011 | Tewes et al. | 709/230 |
| 7,899,680 B2 | 3/2011 | Insley et al. | |
| 8,090,810 B1 | 1/2012 | Insley et al. | |
| 2001/0056483 A1 | 12/2001 | Davis | |
| 2002/0059627 A1 | 5/2002 | Islam et al. | |
| 2002/0078231 A1 | 6/2002 | Chang et al. | |
| 2002/0129305 A1 | 9/2002 | Ahrens et al. | |
| 2002/0133581 A1* | 9/2002 | Schwartz et al. | 709/223 |
| 2002/0156840 A1 | 10/2002 | Ulrich et al. | |
| 2003/0008805 A1 | 1/2003 | Honma et al. | |
| 2003/0033361 A1 | 2/2003 | Garnett et al. | |
| 2003/0061320 A1 | 3/2003 | Grover et al. | |
| 2003/0088655 A1 | 5/2003 | Leigh et al. | |
| 2003/0088805 A1 | 5/2003 | Majni et al. | |
| 2003/0135748 A1 | 7/2003 | Yamada et al. | |
| 2003/0163651 A1 | 8/2003 | Jain et al. | |
| 2003/0200266 A1 | 10/2003 | Henry | |
| 2004/0064731 A1* | 4/2004 | Nguyen et al. | 713/201 |
| 2004/0093592 A1 | 5/2004 | Rao | |
| 2004/0133643 A1 | 7/2004 | Warren et al. | |
| 2004/0136720 A1* | 7/2004 | Mahowald et al. | 398/135 |
| 2004/0177178 A1* | 9/2004 | Gregg et al. | 710/52 |
| 2004/0215948 A1 | 10/2004 | Abbey et al. | |
| 2004/0250072 A1 | 12/2004 | Ylonen | |
| 2005/0004974 A1* | 1/2005 | Sharma et al. | 709/202 |
| 2005/0021722 A1 | 1/2005 | Metzger | |
| 2005/0033952 A1 | 2/2005 | Britson | |
| 2005/0044170 A1 | 2/2005 | Cox et al. | |
| 2005/0044207 A1 | 2/2005 | Goss et al. | |
| 2005/0125118 A1 | 6/2005 | Chalker et al. | |
| 2005/0129035 A1 | 6/2005 | Saito | |
| 2005/0144493 A1 | 6/2005 | Cromer et al. | |
| 2005/0165989 A1* | 7/2005 | Kim | 710/260 |
| 2005/0188071 A1 | 8/2005 | Childress et al. | |
| 2005/0193021 A1 | 9/2005 | Peleg | |
| 2005/0193182 A1 | 9/2005 | Anderson et al. | |
| 2005/0221722 A1 | 10/2005 | Cheong | |
| 2005/0283606 A1 | 12/2005 | Williams | |
| 2005/0288828 A1 | 12/2005 | Claseman | |
| 2005/0289548 A1 | 12/2005 | Farchi et al. | |
| 2006/0039468 A1* | 2/2006 | Emerson et al. | 375/240.01 |
| 2006/0095224 A1* | 5/2006 | Lambert | 702/122 |
| 2006/0156054 A1 | 7/2006 | Brown et al. | |
| 2006/0179184 A1 | 8/2006 | Fields et al. | |
| 2006/0200471 A1 | 9/2006 | Holland et al. | |
| 2006/0200548 A1* | 9/2006 | Min | 709/224 |

FOREIGN PATENT DOCUMENTS

| | | |
|---|---|---|
| EP | 0 621 706 A | 10/1994 |
| JP | 58181395 | 10/1983 |
| WO | WO-03023561 | 3/2003 |
| WO | WO 03023561 | 3/2003 |

OTHER PUBLICATIONS

Kistler, M. et al., "Console over Ethernet", IBM (2003) pp. 1-16.
PCT International Search Report and Written Opinion for PCT/US2006/007231; Intl Filing Date: Feb. 28, 2006; Mailing Date: Aug. 7, 2006 (8 pages).
PCT International Search Report and Written Opinion for PCT/US2006/007287; Intl Filing Date: Feb. 28, 2006; Mailing Date: Jul. 6, 2006 (8 pages).
Co-pending U.S. Appl. No. 11/073,045, filed Mar. 4, 2005.
Co-pending U.S. Appl. No. 11/074,229, filed Mar. 4, 2005.
Co-pending U.S. Appl. No. 11/073,293, filed Mar. 4, 2005.
Co-pending U.S. Appl. No. 11/073,260, filed Mar. 4, 2005.
Notice of Allowance mailed Mar. 1, 2010 Co-pending U.S. Appl. No. 11/073,045, filed Mar. 4, 2005.
Notice of Allowance mailed Dec. 31, 2009 in Co-pending U.S. Appl. No. 11/073,045, filed Mar. 4, 2005.
Notice of Allowance Mailed Oct. 28, 2008 in Co-pending U.S. Appl. No. 11/073,260, filed Mar. 4, 2005.
Notice of Allowance Mailed Jul. 15, 2008 in Co-pending U.S. Appl. No. 11/073,260, filed Mar. 4, 2005.
Final Office Action mailed Feb. 19, 2009 in Co-pending U.S. Appl. No. 11/073,045, filed Mar. 4, 2005.
Final Office Action mailed Apr. 11, 2008 in Co-pending U.S. Appl. No. 11/073,045, filed Mar. 4, 2005.
Final Office Action Mailed Feb. 3, 2010 in Co-pending U.S. Appl. No. 11/074,229, filed Mar. 4, 2005.
Final Office Action Mailed Feb. 25, 2009 in Co-pending U.S. Appl. No. 11/074,229, filed Mar. 4, 2005.
Final Office Action Mailed Mar. 31, 2008 in Co-pending U.S. Appl. No. 11/074,229, filed Mar. 4, 2005.
Non-Final Office Action mailed Jul. 6, 2009 in Co-pending U.S. Appl. No. 11/073,045, filed Mar. 4, 2005.
Non-Final Office Action mailed Aug. 19, 2008 in Co-pending U.S. Appl. No. 11/073,045, filed Mar. 4, 2005.
Non-Final Office Action mailed Dec. 7, 2007 in Co-pending U.S. Appl. No. 11/073,045, filed Mar. 4, 2005.
Non-Final Office Action Mailed Aug. 13, 2009 in Co-pending U.S. Appl. No. 11/074,229, filed Mar. 4, 2005.
Non-Final Office Action Mailed Aug. 18, 2008 in Co-pending U.S. Appl. No. 11/074,229, filed Mar. 4, 2005.
Non-Final Office Action Mailed Oct. 30, 2007 in Co-pending U.S. Appl. No. 11/074,229, filed Mar. 4, 2005.
Non-Final Office Action Mailed Sep. 28, 2009 in Co-pending U.S. Appl. No. 11/073,293, filed Mar. 4, 2005.
Non-Final Office Action Mailed Feb. 5, 2008 in Co-pending U.S. Appl. No. 11/073,260, filed Mar. 4, 2005.
Non-Final Office Action Mailed Jul. 26, 2007 in Co-pending U.S. Appl. No. 11/073,260, filed Mar. 4, 2005.
Final Office Action Mailed Dec. 9, 2010 in Co-pending U.S. Appl. No. 11/074,229, filed Mar. 4, 2005.
Non-Final Office Action mailed May 26, 2010 in Co-Pending U.S. Appl. No. 11/073,293, filed Mar. 4, 2005.
Non-Final Office Action mailed Jul. 2, 2010 in Co-Pending U.S. Appl. No. 11/074,229, filed Mar. 4, 2005.
Notice of Allowance Mailed Jul. 20, 2010 in Co-Pending U.S. Appl. No. 11/073,045, filed Mar. 4, 2005.
Notice of Allowance Mailed Nov. 15, 2010 in Co-pending U.S. Appl. No. 11/073,293, filed Mar. 4, 2005.
Non-Final Office Action Mailed Mar. 28, 2011 in Co-Pending U.S. Appl. No. 11/074,229, filed Mar. 4, 2005.
Notice of Allowance Mailed Sep. 27, 2011 in Co-pending U.S. Appl. No. 11/074,229, filed Mar. 4, 2005.
International Search Report PCT/US2006/007231 dated Aug. 7, 2006, pp. 1-2.
Written Opinion PCT/US2006/007231 dated Aug. 7, 2006, pp. 1-5.
International Search Report PCT/US2006/007287 dated Jul. 6, 2006, pp. 1-4.
Written Opinion PCT/US2006/007287 dated Jul. 6, 2006, pp. 1-4.

* cited by examiner

| 15 | 14 | 13:12 | 11:0 |
|---|---|---|---|
| Value | Simultaneous | Event Type | Signal ID |

*FIG. 10*

| S | Slave Address | W | Cmd 1 | Cmd 2 | Param 1 | Param 2 | P |

*FIG. 12*

| S | Slave Address | R | Data 1 | Data 2 | P |

*FIG. 13*

METHOD AND APPARATUS FOR COMMUNICATING BETWEEN AN AGENT AND A REMOTE MANAGEMENT MODULE IN A PROCESSING SYSTEM

CROSS-REFERENCE TO RELATED APPLICATIONS

This application is related to U.S. patent application Ser. No. 11/073,045, entitled, "Protecting Data Transactions on an Integrated Circuit Bus," by M. Insley et al., filed on Mar. 4, 2005, which is hereby incorporated herein by reference.

FIELD OF THE INVENTION

At least one embodiment of the present invention pertains to remote management of a processing system and more particularly, to a method and apparatus for communicating between an agent and a remote management module in a processing system.

BACKGROUND

In many types of computer networks, it is desirable to be able to perform certain management related functions on a processing system from a remote location. For example, a business enterprise may operate a large computer network that includes numerous client and server processing systems (hereinafter "clients" and "servers", respectively). With such a network, it may be desirable to allow a network administrator to perform or control various functions on the clients and/or servers from a remote console via the network, such as monitoring various functions and conditions in these devices, configuring the devices, performing diagnostic functions, debugging, software upgrades, etc. To facilitate explanation, such functions are referred to collectively and individually as "management functions".

One particular application in which it is desirable to have this capability is in a storage-oriented network, i.e., a network that includes one or more storage servers that store and retrieve data on behalf of one or more clients. Such a network may be used, for example, to provide multiple users with access to shared data or to backup mission critical data. An example of such a network is illustrated in FIG. 1.

In FIG. 1, a storage server 2 is coupled locally to a storage subsystem 4, which includes a set of mass storage devices, and to a set of clients 1 through a network 3, such as a local area network (LAN) or wide area network (WAN). The storage server 2 operates on behalf of the clients 1 to store and manage shared files or other units of data (e.g., blocks) in the set of mass storage devices. Each of the clients 1 may be, for example, a conventional personal computer (PC), workstation, or the like. The storage subsystem 4 is managed by the storage server 2. The storage server 2 receives and responds to various read and write requests from the clients 1, directed to data stored in, or to be stored in, the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The mass storage devices may be organized into one or more volumes of Redundant Array of Inexpensive Disks (RAID).

Also shown in FIG. 1 is an administrative console 5 coupled to the storage server 2. The storage server 2 in this configuration includes a communication port (e.g., RS-232) and appropriate software to allow direct communication between the storage server 2 and the administrative console 5 through a transmission line. This configuration enables a network administrator to perform at least some of the types of management functions mentioned above on the storage server 2. Filer products made by Network Appliance, Inc. of Sunnyvale, Calif., are an example of storage servers which has this type of capability.

In the illustrated configuration, the administrative console 5 must be directly coupled to the storage server 2 and must be local to the storage server 2. This limitation is disadvantageous, in that it may be impractical or inconvenient to locate the administrative console 5 close to the storage server 2. Further, this configuration makes it difficult or impossible to use the same administrative console to manage multiple devices on a network.

Technology does exist to enable management functions to be performed on a computer system remotely via a network. In one approach, a device known as a remote management module (RMM) is incorporated into a processing system to enable remote management of the processing system (referred to as the "host" processing system) via a network. The RMM is often in the form of a dedicated circuit card separate from the other elements of the host processing system. The RMM normally has a network interface that connects to the network and a separate internal interface that connects to one or more components of the processing system. The RMM typically includes control circuitry (e.g., a microprocessor or microcontroller) which is programmed or otherwise configured to respond to commands received from a remote administrative console via the network and to perform at least some of the management functions mentioned above.

One shortcoming of known RMM technology is that the internal interface between the RMM and the host processing system, as well as the software on the RMM, are generally customized for a particular design of host processing system. As a result, it tends to be complicated and expensive to port to an existing RMM design to a different design of host processing system. Furthermore, upgrades or other design changes to the RMM tend to be difficult and expensive.

Hence, it would be desirable to have remote management technology which enables remote management functions on a processing system, such as a storage server, where the remote management technology is more platform-independent, and thus, more readily usable with multiple host processing system designs.

SUMMARY OF THE INVENTION

The present invention includes a processing system that comprises control circuitry to control the processing system, a remote management module to enable remote management of the processing system via a network, and an agent to operate as an intermediary between the remote management module and the control circuitry. The agent and the remote management module are configured to cooperatively implement an abstraction layer through which the agent and the remote management module communicate.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 10 illustrates the format of an event record, according to embodiments of the invention;

FIG. 12 illustrates the format of a Write packet, according to embodiments of the invention; and FIG. 13 illustrates the format of a Read packet, according to embodiments of the invention.

DETAILED DESCRIPTION

A method and apparatus for communicating event data from an agent to an RMM in a processing system are described. A processing system such as a storage server can include a remote management module, which enables remote management of the processing system via a network, and an agent, which is used to monitor for various events in the processing system and acts as an intermediary between the RMM and the control circuitry of the processing system. In accordance with embodiments of the invention, as described in greater detail below, the agent and the RMM in such a processing system cooperatively implement an abstraction layer, through which the agent and the remote management module communicate event data and other information. The abstraction layer makes the RMM more platform-independent, and thus, more usable for various different designs of host processing system.

The agent continuously monitors for any of various events that may occur within the processing system. The processing system includes sensors to detect at least some of these events. The agent includes a first-in first-out (FIFO) buffer. Each time an event is detected, the agent queues an event record describing the event into the FIFO buffer. When an event record is stored in the FIFO buffer, the agent asserts an interrupt to the RMM. The interrupt remains asserted while event record data is present in the FIFO.

When the RMM detects assertion of the interrupt, the RMM sends a request for the event record data to the agent over a dedicated link between the agent and the RMM. In certain embodiments of the invention, that link is an inter-IC (I1C or I2C) bus. In response to the request, the agent begins dequeuing the event record data from the FIFO and transmits the data to the RMM. The RMM timestamps the event record data as they are dequeued and stores the event record data in a non-volatile event database in the RMM. The RMM may then transmit the event record data to a remote administrative console over the network, where the data can be used to output an event notification to the network administrator.

Events are encoded with event numbers by the agent, and the RMM has knowledge of the encoding scheme. As a result, the RMM can determine the cause of any event (from the event number) without requiring any detailed knowledge of the hardware.

The above-mentioned abstraction layer, which provides greater platform independence, is formed by the use of the above-mentioned queuing and dequeuing of event data, along with a command packet protocol by which the RMM requests and receives event record data from the agent. One advantage of this technique, in addition to greater platform independence, is that the RMM does not have to read the event data from the agent at the same speed at which the agent acquires the event data. Consequently, the RMM can read the event data at a slower rate, for example, then the rate at which the events occur or are detected by the agent.

Figure 1:
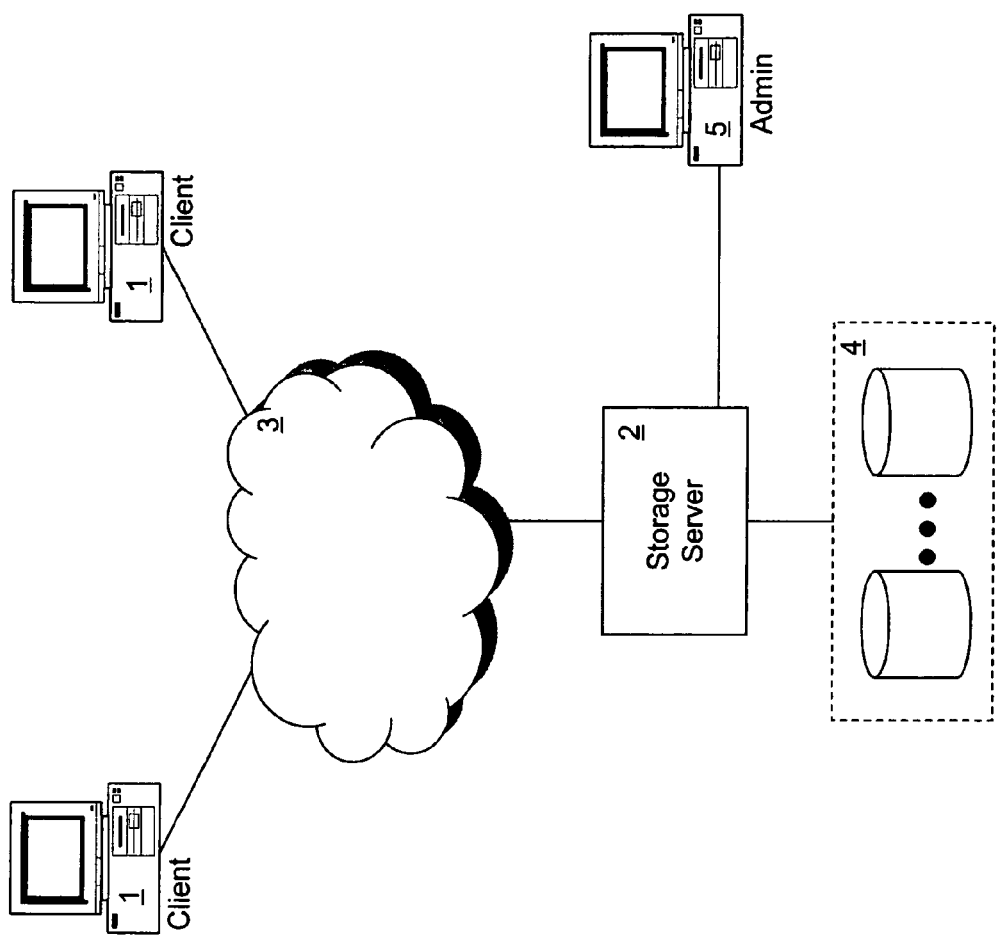
FIG. 1 illustrates a network environment which includes a storage server managed from an administrative console.
Figure 2:
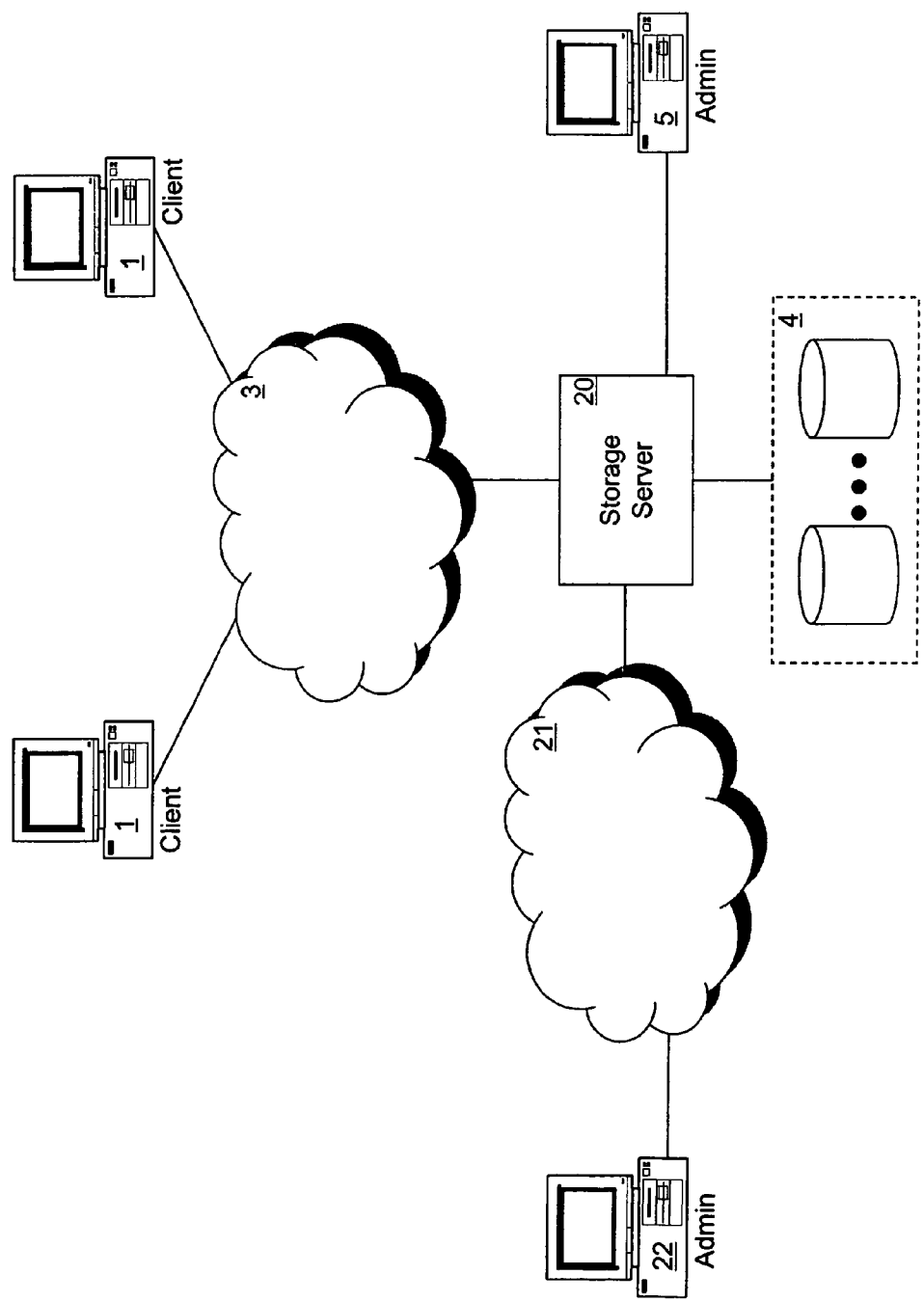
FIG. 2 illustrates a network environment which includes a storage server that can be managed remotely from an administrative console over a network.

An example of a network configuration in which this approach can be employed is shown in FIG. 2. It is assumed, for purposes of this description, that the processing system to be remotely managed is a storage server 20; however, it will be recognized that the technique introduced herein can also be applied to essentially any other type of network-connected processing system, such as standard personal computers (PCs), workstations, servers other than storage servers, etc. The configuration of FIG. 2 is similar to that of FIG. 1, except that the storage server 20 can be managed through a network 21 from a remote administrative console 22, in addition to being capable of being managed through the direct serial interface. Note that while network 3 and network 21 are depicted as separate networks in FIG. 2, they can be the same network.

Figure 3:
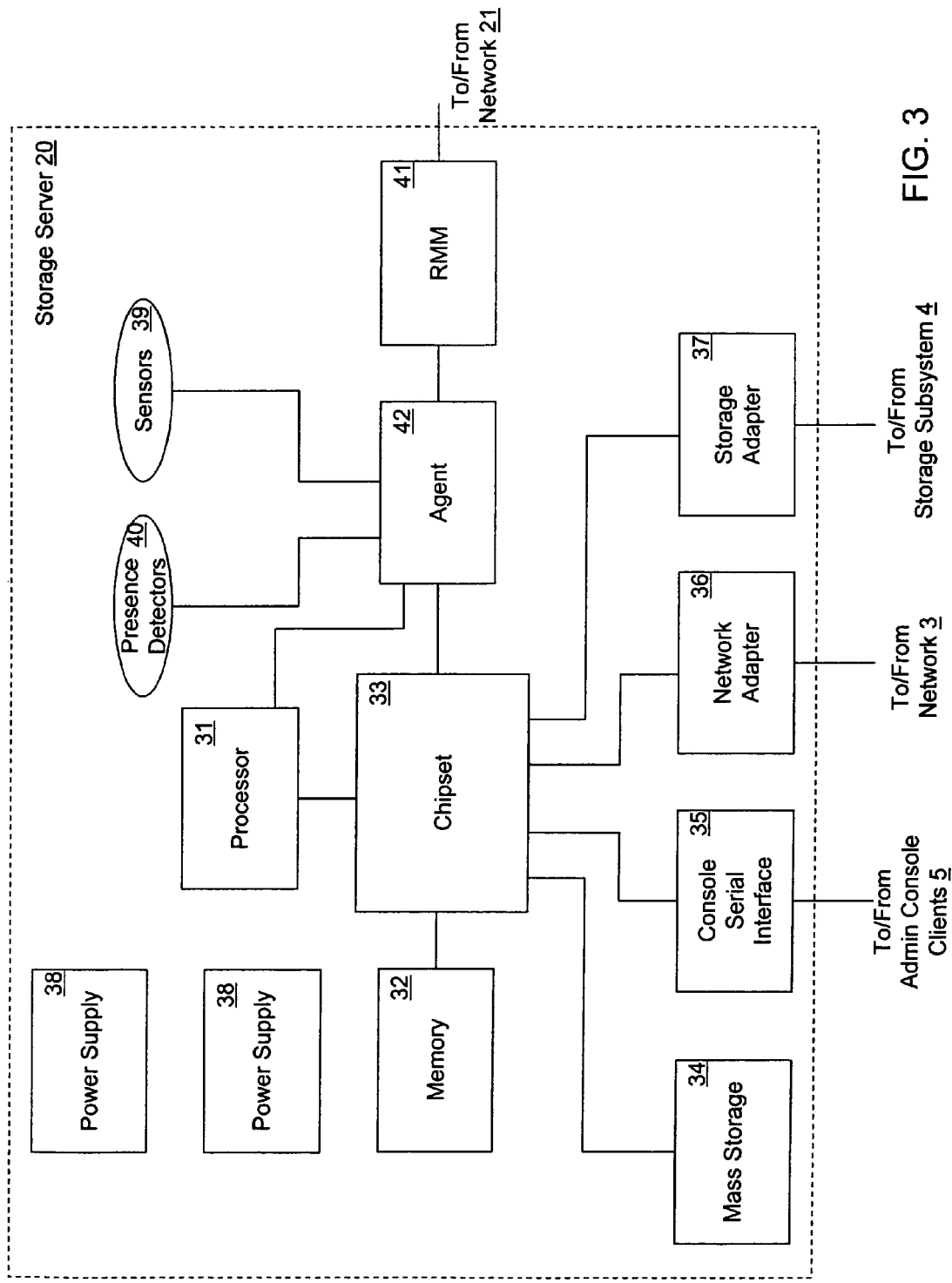
FIG. 3 is a block diagram of the storage server of FIG. 2, according to embodiments of the invention.

FIG. 3 is a high-level block diagram of the storage server 20, according to at least one embodiment of the invention. The storage server 20 may be, for example, a file server, and more particularly, may be a network attached storage (NAS) appliance (e.g., a filer). Alternatively, the storage server 20 may be a server which provides clients 1 with access to individual data blocks, as may be the case in a storage area network (SAN). Alternatively, the storage server 20 may be a device which provides clients 1 with access to data at both the file level and the block level.

Referring now to FIG. 3, the storage server 20 includes one or more processors 31 and memory 32, which are coupled to each other through a chipset 33. The chipset 33 may include, for example, a conventional Northbridge/Southbridge combination. The processor(s) 31 represent(s) the central processing unit (CPU) of the storage server 20 and may be, for example, one or more programmable general-purpose or special-purpose microprocessors or digital signal processors (DSPs), microcontrollers, application specific integrated circuits (ASICs), programmable logic devices (PLDs), or a combination of such devices. The memory 32 may be, or may include, any of various forms of read-only memory (ROM), random access memory (RAM), Flash memory, or the like, or a combination of such devices. The memory 32 stores, among other things, the operating system of the storage server 20.

The storage server 20 also includes one or more internal mass storage devices 34, a console serial interface 35, a network adapter 36 and a storage adapter 37, which are coupled to the processor(s) through the chipset 33. The storage server 20 may further include redundant power supplies 38, as shown.

The internal mass storage devices 34 may be or include any conventional medium for storing large volumes of data in a non-volatile manner, such as one or more magnetic or optical based disks. The serial interface 35 allows a direct serial connection with a local administrative console, such as console 5 in FIG. 2, and may be, for example, an RS-232 port. The storage adapter 37 allows the storage server 20 to access the storage subsystem 4 and may be, for example, a Fibre Channel adapter or a SCSI adapter. The network adapter 36 provides the storage server 20 with the ability to communicate with remote devices, such as the clients 1, over network 3 and may be, for example, an Ethernet adapter.

The storage server 20 further includes a number of sensors 39 and presence detectors 40. The sensors 39 are used to detect changes in the state of various environmental variables in the storage server 20, such as temperatures, voltages, binary states, etc. The presence detectors 40 are used to detect the presence or absence of various components within the storage server 20, such as a cooling fan, a particular circuit card, etc.

The storage server 20 further includes an RMM 41 and an associated agent 42. The RMM provides a network interface and is used to allow a remote processing system, such as an administrative console, to control and/or perform various management functions on the storage server via network 21, which may be a LAN or a WAN, for example. The management functions may include, for example, monitoring various functions and state in the storage server 20, configuring the storage server 20, performing diagnostic functions on and debugging the storage server 20, upgrading software on the storage server 20, etc. The RMM 41 is designed to operate independently of the storage server 20. Hence, the RMM 41 runs on standby power and/or an independent power supply, so that it is available even when the main power to the storage server 20 is off. In certain embodiments of the invention, the RMM 41 provides diagnostic capabilities for the storage server 20 by maintaining a log of console messages that remain available even when the storage server 20 is down. The RMM 41 is designed to provide enough information to determine when and why the storage server 20 went down, even by providing log information beyond that provided by the operating system of the storage server 20. This functionality includes the ability to send a notice to the remote administrative console 22 on its own initiative, indicating that the storage server 20 is down, even when the storage server 20 is unable to do so.

The agent 42, at a high level, monitors various functions and states within the storage server 20 and acts as an intermediary between the RMM 41 and the other components of the storage server 20. Hence, the agent 42 is coupled to the RMM 41 as well as to the chipset 33 and the processor(s) 31 of the storage server 20, and receives input from the sensors 39 and presence detectors 40.

At a lower level, the agent 42 serves several purposes. First, the agent provides the RMM 41 with certain controls over the storage server 20. These controls include the ability to reset the storage server 20, to generate a non-maskable interrupt (NMI), and to turn on and off the power supplies 38. The agent 42 also monitors the storage server 20 for changes in system-specified signals that are of interest. When any of these signals changes, the agent 42 captures the state of the signal(s) which changed state and presents that data to the RMM 41 for logging. In addition, the agent 42 provides a consolidation point/interrupt controller for the interrupts from the various environmental sensors 39 and detectors 40 in the storage server 20, for use by the host processor(s) 31 of the storage server 20.

Figure 4:
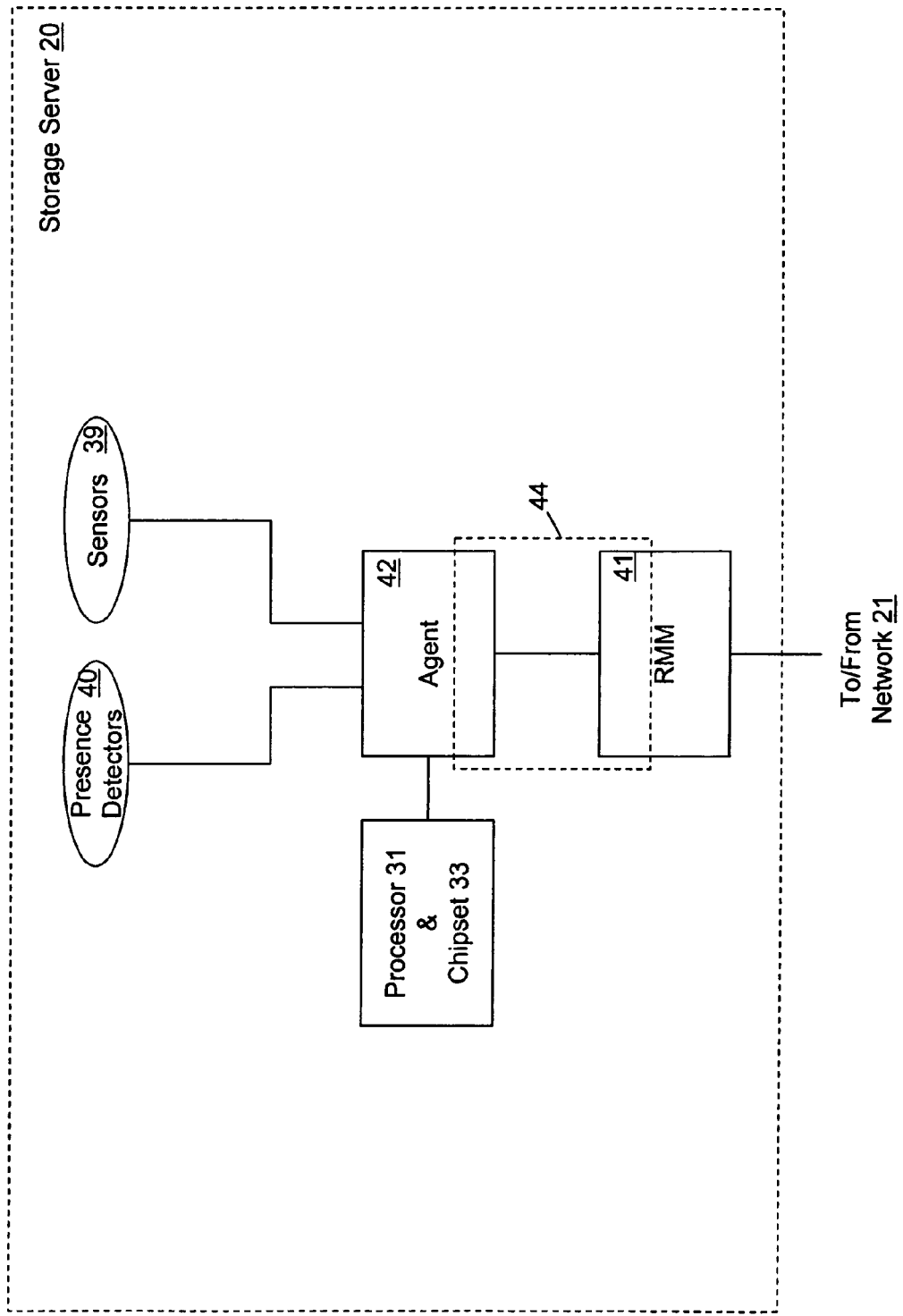
FIG. 4 is a block diagram showing an abstraction layer between the agent and the RMM.

Referring now to FIG. 4, the agent 42 and the RMM 41 cooperatively implement an abstraction layer 44, through which the agent 42 and the RMM 41 communicate event data and other information. The abstraction layer 44 makes the RMM 41 more platform-independent, and thus, more usable for various different designs of host processing systems. As described further below, the abstraction layer 44 is formed by the use of the above-mentioned queuing and dequeuing of event data in the agent 42 along with a command packet protocol by which the RMM 41 requests and receives event record data from the agent 42.

Figure 5:
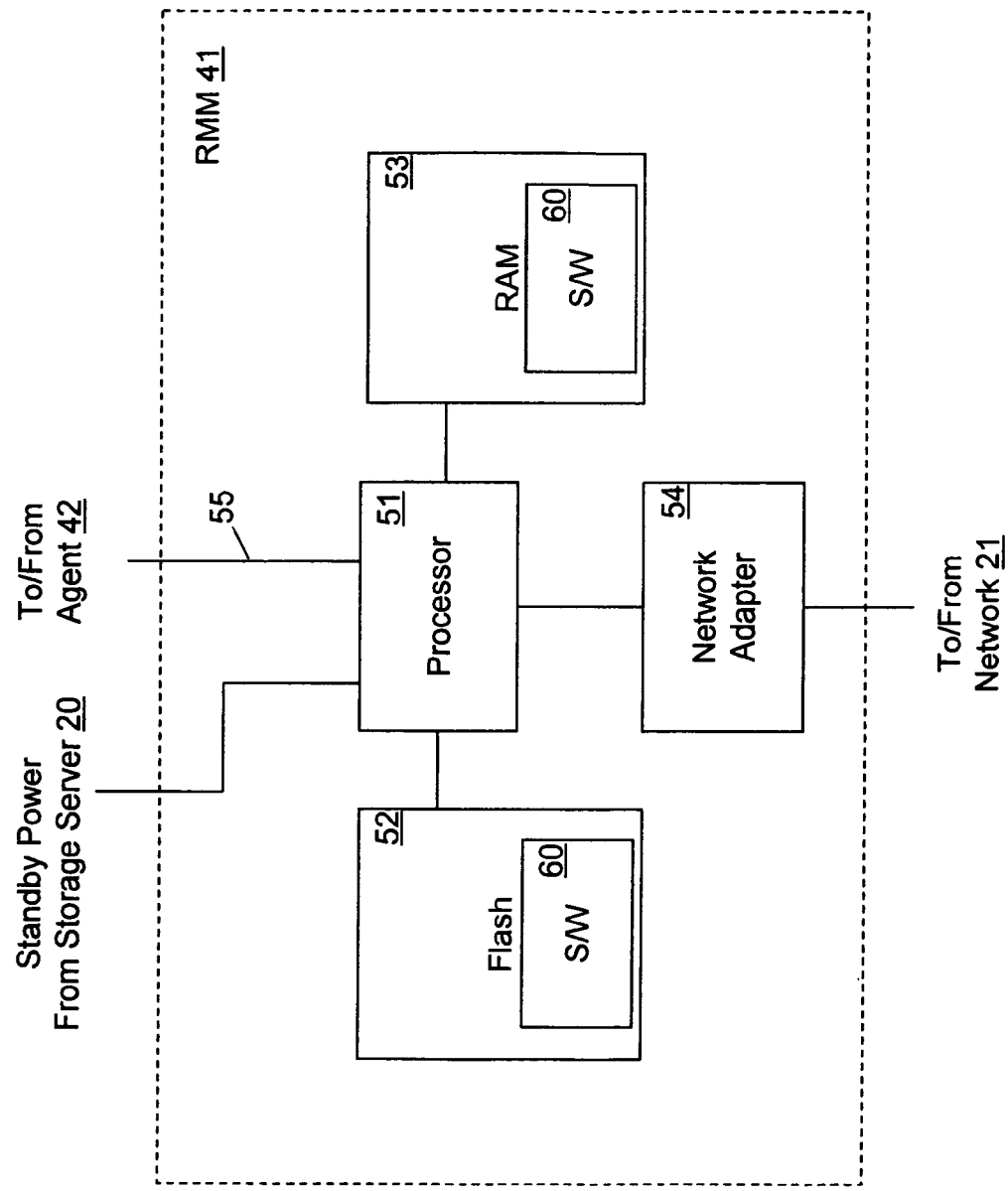
FIG. 5 is a block diagram showing components of the RMM, according to embodiments of the invention.

FIG. 5 is a high-level block diagram showing the relevant components of the RMM 41, according to certain embodiments of the invention. The various components of the RMM 41 may be implemented on a dedicated circuit card installed within the storage server, for example. Alternatively, the RMM 41 could be dedicated circuitry that is part of the storage server 20 but isolated electrically from the rest of the storage server 20 (except as required to communicate with the agent 42). The RMM 41 includes control circuitry, such as one or more processors 51, as well as various forms of memory coupled to the processor, such as flash memory 52 and RAM 53. The RMM 41 further includes a network adapter 54 to connect the RMM 41 to the network 21. The network adapter 54 may be or may include, for example, an Ethernet (e.g., TCP/IP) adapter. Although not illustrated as such, the RMM 41 may include a chipset or other form of controller/bus structure, connecting some or all its various components.

The processor(s) 51 is/are the CPU of the RMM 41 and may be, for example, one or more programmable general-purpose or special-purpose microprocessors, DSPs, microcontrollers, ASICs, PLDs, or a combination of such devices. The processor 51 inputs and outputs various control signals and data 55 to and from the agent 42, as described further below.

Figure 6:
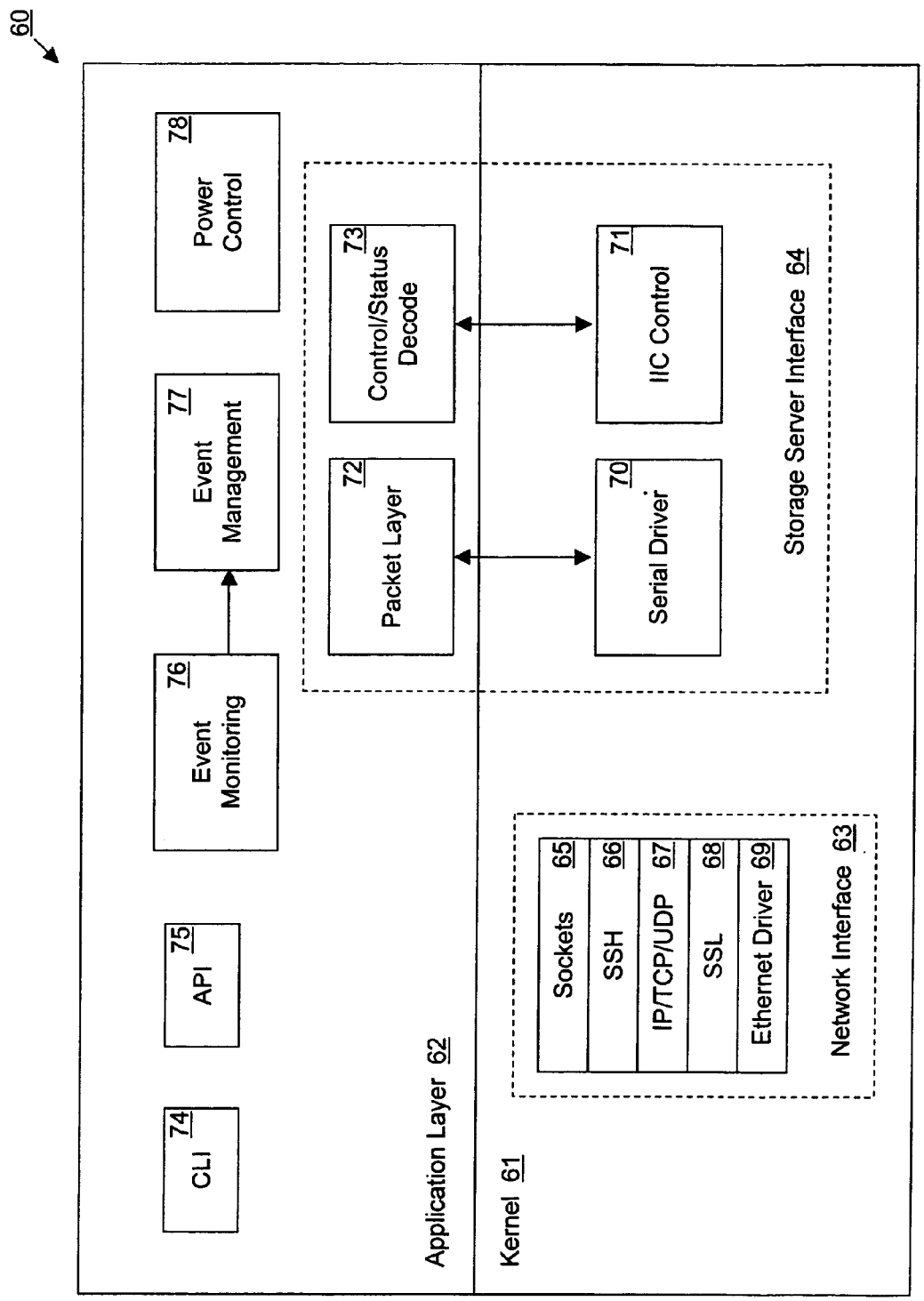
FIG. 6 is a block diagram showing the software architecture in the RMM, according to embodiments of the invention.

In at least one embodiment, the processor 51 is a conventional programmable, general-purpose microprocessor which runs software from local memory on the RMM 41 (e.g., flash 52 and/or RAM 53). FIG. 6 illustrates the relevant aspects of the software of the RMM 41, according to certain embodiments of the invention. At a high level, the software 60 of the RMM 41 has two layers, namely, an operating system kernel 61 and an application layer 62 that runs on top of the kernel 61. In certain embodiments, the kernel 61 is a Linux based kernel. The kernel 61 includes a network interface 63 to control network communications with a remote processing system, and a storage server interface 64 to control communications with the other components of the storage server 20. The network interface 63 includes a protocol stack that includes a sockets layer 65, a Secure Shell (SSH) layer 66, an TCP/IP/UDP layer 67, an SSL layer 68 and an Ethernet driver layer 69. The storage server interface 64 includes a serial driver 70, through which the RMM 41 can communicate with the operating system of the storage server 20, and an IIC control module 71 through which the RMM 41 can communicate with the agent 42 over an IIC bus.

The application layer 62 includes a packet layer 72, which cooperates with the serial driver 70, and a control/status decode layer 73 which cooperates with the IIC control module 71. The packet layer 72 is responsible for converting packets received from other modules in the application layer 62 into a serial format for transmission by the serial driver 70, and for converting serial data received from the serial driver 70 into a packet format for use by other modules in application layer 62. The control/status decode layer 73 is responsible for implementing a command packet protocol on the IIC bus for communication with the agent 42, as described further below.

The application layer 62 also includes: a command line interface (CLI) 74 to allow an authorized user to control functions of the RMM 41; an application programming interface (API) 75 to allow an authorized remote application to make calls to the RMM software 60; an event monitoring module 76 to request dequeuing of event data from the agent 42 and to assign timestamps to the dequeued data; an event management module 77 to receive event information from the event monitoring module 76, to manage a local event database in the RMM 41, and to generate outbound alerts for transmission over the network 21 in response to certain events; and a power control module 78 to control power to the storage server 20.

Figure 7:
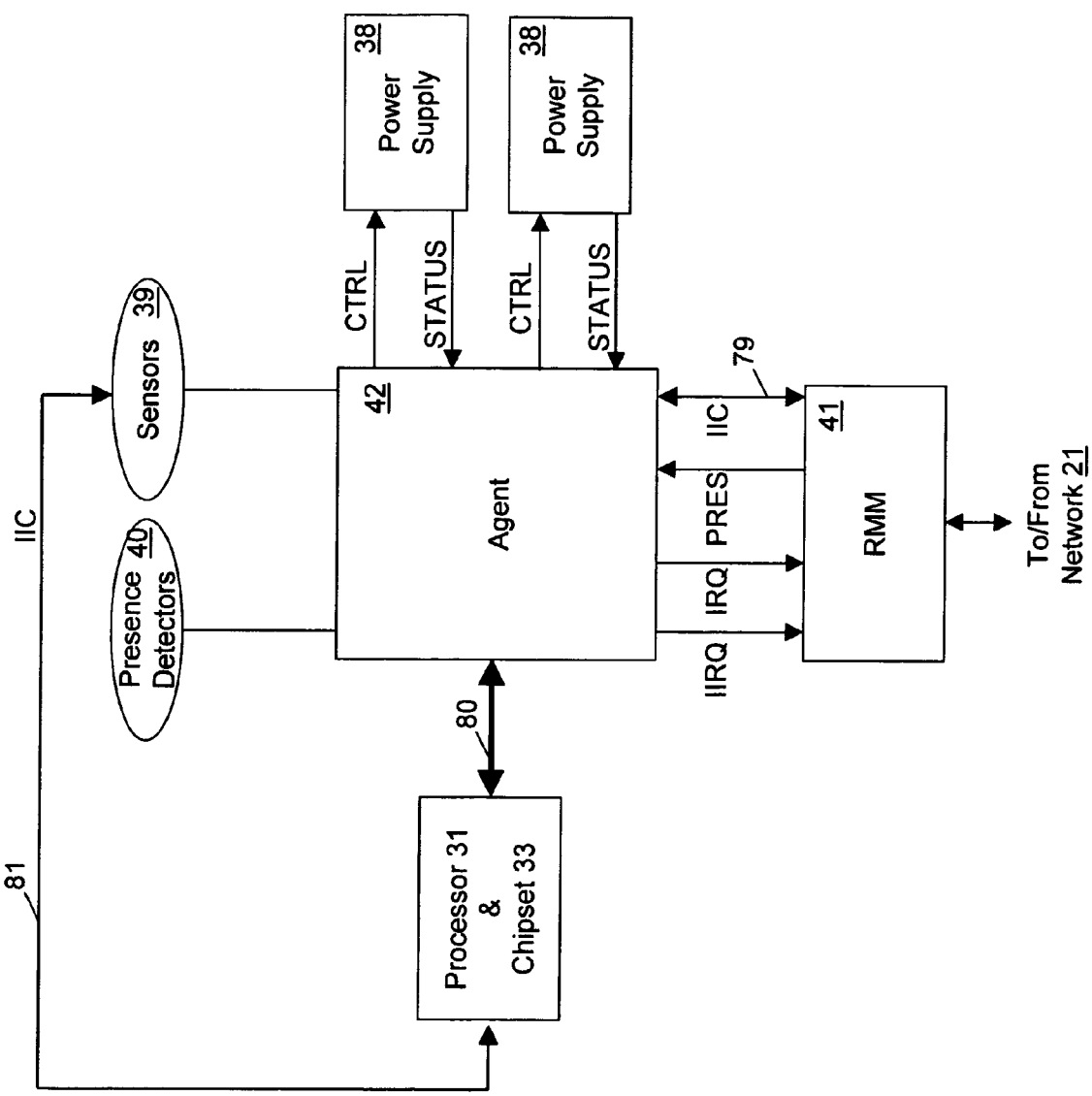
FIG. 7 is a block diagram showing the communications interface between the agent and the RMM and other components, according to embodiments of the invention.

FIG. 7 illustrates the connections between the agent 42 and the RMM 41 and other components in the storage server 20, according to certain embodiments of the invention. As shown, with the RMM 41 receives from the agent 42 two interrupt signals, namely, a normal interrupt IRQ, and an immediate interrupt IIRQ. The normal interrupt IRQ is asserted whenever the FIFO buffer (not shown in FIG. 7) in the agent 42 contains event data, and the RMM 41 responds to the normal interrupt IRQ by requesting data from the FIFO buffer. In contrast, the immediate interrupt IIRQ is asserted for a critical condition which must be acted upon immediately, such as an imminent loss of power to the storage server 20. The agent 42 is preconfigured to generate the immediate interrupt IIRQ only in response to a specified critical event, and the RMM 41 is preconfigured to know the meaning of the immediate interrupt IIRQ (i.e., the event which caused the immediate interrupt IIRQ). Accordingly, the RMM 41 will immediately respond to the immediate interrupt IIRQ with a preprogrammed response routine, without having to request event data from the agent 42. The preprogrammed response to the immediate interrupt IIRQ may include, for example, automatically dispatching an alert e-mail or other form of electronic alert message to the remote administrative console 21. Although only one immediate interrupt IIRQ is shown and described here, the agent 42 can be configured to provide multiple immediate interrupt signals to the RMM 41, each corresponding to a different type of critical event.

The agent 42 and the RMM 41 are also connected by a bidirectional I1C bus 79, which is primarily used communicating data on monitored signals and states (i.e. event data) from the agent 42 to the RMM 41. A special command packet protocol is implemented on this IIC bus 79, as described further below. Note that in other embodiments of the invention, an interconnect other than IIC can be substituted for the IIC bus 79. For example, in other embodiments the interface provided by IIC bus 79 may be replaced by an SPI, JTAG, USB, IEEE-488, RS-232, LPC, IIC, SMBus, X-Bus or MII interface. The RMM 41 also provides a presence signal PRES to the agent 42, which is a binary signal that indicates to the agent 42 when the RMM 41 is present (installed and operational).

The interface 80 between the agent 42 and the CPU 31 and chipset 33 of the storage server 20 is similar to that between the agent 42 and the RMM 41; however, the details of that interface 80 are not germane to the present invention.

The sensors 39 further are connected to the CPU 31 and chipset 33 by an IIC bus 81. The agent 42 further provides a control signal CTRL to each power supply 38 to enable/disable the power supplies 38 and receives a status signal STATUS from each power supply 38.

Figure 8:
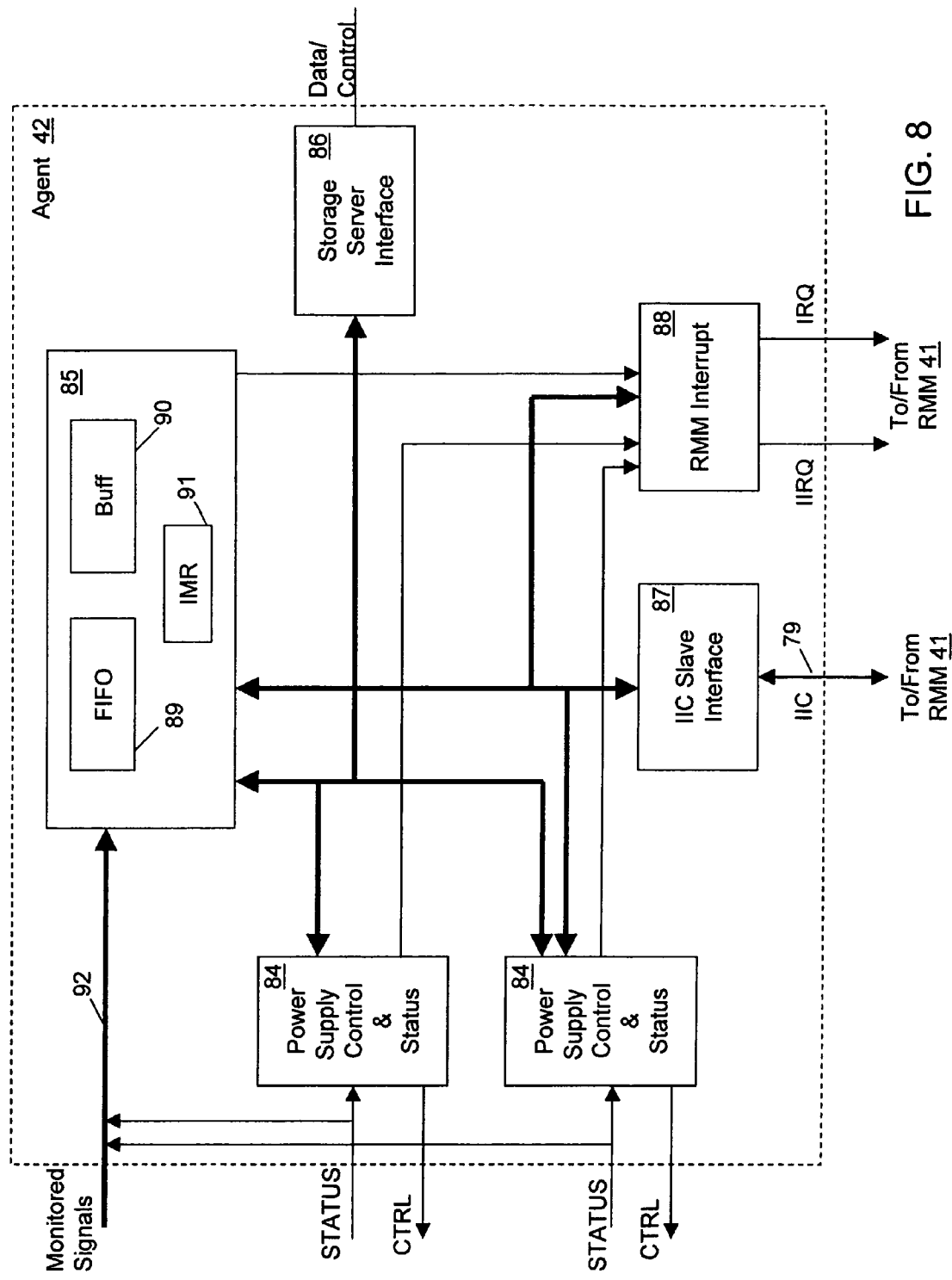
FIG. 8 is a block diagram showing components of the agent, according to embodiments of the invention.

In certain embodiments, the agent 42 is embodied as one or more integrated circuit (IC) chips, such as a microcontroller, a microcontroller in combination with an FPGA, or other configuration. FIG. 8 shows the relevant internal features of the agent 42, according to certain embodiments of the invention. The agent 42 includes a set of power supply control/status modules 84 (one for each power supply 38), an event detection module 85, a storage server slave interface 86, and IIC slave interface 87, and an RMM interrupt module 88. The power supply control/status modules 84 monitor power supply status and control the enabling/disabling of the power supplies 38. The event detection module 85 includes the FIFO buffer 89 used to transfer data to the RMM 41, as well as a separate buffer 90 used to transfer event data to the storage server control circuitry of the storage server 20. The event detection module 85 also includes an interrupt mask register (IMR) 91. The storage server slave interface 86 provides a data and control interface to the storage server control circuitry. The IIC slave interface 87 provides a connection via the IIC bus 79 to the RMM 41. The RMM interrupt module 88 is responsible for asserting the normal interrupt IRQ when event data is stored in the FIFO buffer 89 and for asserting the immediate interrupt IIRQ if a specified critical event (e.g., imminent loss of power) is detected by the agent 42.

Figure 9:
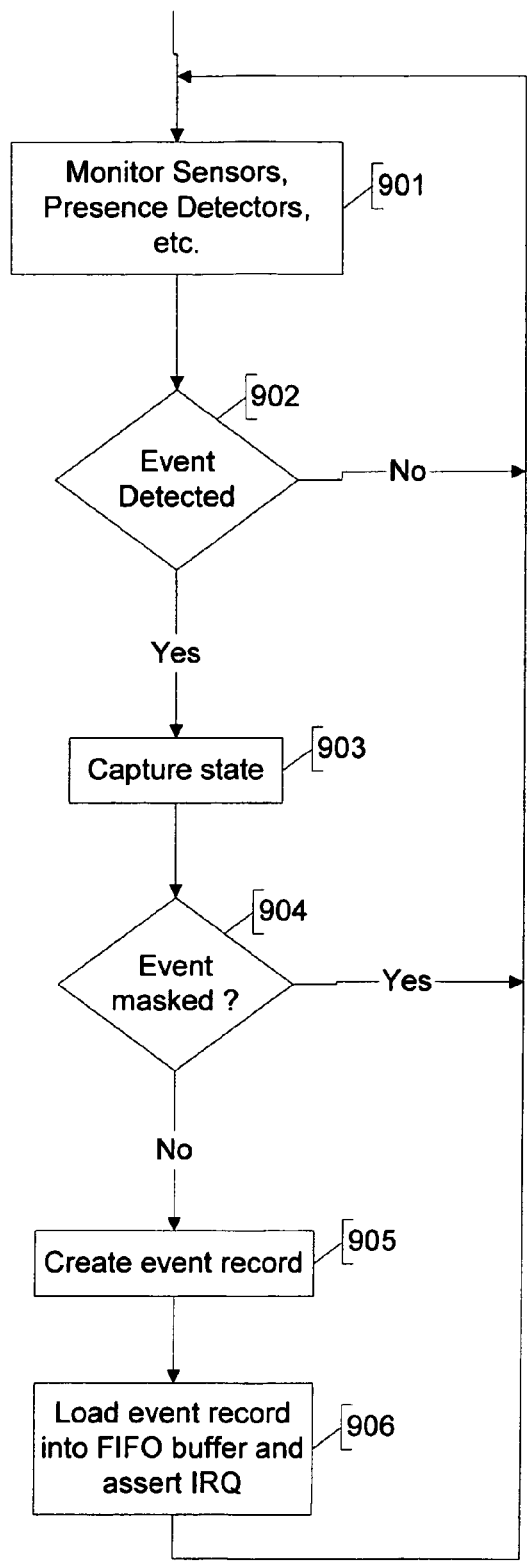
FIG. 9 is a flow diagram showing an event detection and recordation process performed by the agent, according to embodiments of the invention.

As noted above, the agent 42 acts as an interrupt controller for monitored signals 92 from the sensors 39, presence detectors 40, etc. The process of detecting and responding to events is described now with reference to FIG. 9. At block 901 the event detection module 85 in the agent 42 monitors sensors 39, present detectors 40 and other signals in the storage system 20. If the event detection module 85 detects a specified change in state in any the monitored signals 92 at block 902, it captures the state of the changed signal at block 903. A change in state on any of the signals constitutes an event. Typically, such a change is a high-to-low or low-to-high transition across a specified threshold. When the event detection module 85 detects such an event at block 902, it compares the bits that changed against the IMR 91 at block 904. For every unmasked bit (according to the IMR 91) that caused an event, at block 905 the event detection module 85 creates an event record and at block 906 loads each such event record into the FIFO buffer 89, which is essentially an event queue. The presence of one or more event records in the FIFO buffer 89 causes the event detection module 85 to signal the RMM interrupt module 88 to assert the normal interrupt IRQ.

The RMM 41 responds by reading the FIFO buffer 89 (as described below) until the agent 41 de-asserts the normal interrupt IRQ (which the agent 42 does when the FIFO buffer 89 becomes empty). The size of the FIFO buffer 89 is chosen such that it can hold at least the maximum number of events that the agent 42 concurrently monitors plus some predetermined number of additional events.

Although the specific format of event records in the FIFO buffer is implementation-specific, FIG. 10 illustrates one possible format. In the illustrated example, an event record is a 16-bit entity. The most significant bit, bit[15], is the Value bit, which reflects the state of the monitored signal. For example, the state of the Value bit indicates whether the monitored signal is asserted or de-asserted. The next most significant bit, bit[14], is the Simultaneous bit which, when asserted, indicates that this event occurred at the same time as the event which proceeds it in the FIFO buffer 89.

Bits[13:12] are the Event Type field, which encodes each event as one of four possible types of events: Normal system event, Status event, Storage Server Command event, or RMM Command event. With regard to the Normal system event type, when an unmasked event occurs at the input to the agent 42, the event is entered into the FIFO buffer 89 if the signal is not masked. With regard to the Status event type, in response to an "RMM Capture Sensor State" command from the RMM 41 (on the IIC bus 79), the agent 42 scans all of its sensor inputs and places an entry into the FIFO buffer 89 with the Event Type field set to indicate a Status event. With regard to the Storage Server Command event type, certain agent commands associated with the storage server 20 can be specified to result in entries being recorded in the FIFO buffer 89; when such a command is received from the RMM interface, the event type bits are set to indicate a Storage Server Command event. Similarly, certain agent commands associated with the RMM 41 can be specified to result in entries being recorded in the FIFO buffer 89; when such a command is received from the RMM interface, the event type bits are set to indicate an RMM Command event.

Bits[11:0] of the event record are the Signal ID. For Normal and Status events, this field is the encoded signal number (identifier). Each signal is assigned a number with 12 bits, allowing detection of up to 4,000 different events. For Command events, this field contains the command value if the command is designed to generate an event or if the command is a non-supported command. For supported commands, bit [15] of the event record is cleared. Any command received which is not supported by the agent 42 is also placed into the FIFO buffer 89, but with bit [15] set.

The RMM 41 uses a command packet protocol to control the agent 42. This protocol, in combination with the FIFO buffer and described above, provides the abstraction layer 44 between the RMM 41 and the agent 42. In certain embodiments, the command and data link between the RMM 41 and the agent 42 is the IIC bus 79, as described above; however, in other embodiments a different type of link can be used.

Figure 11:
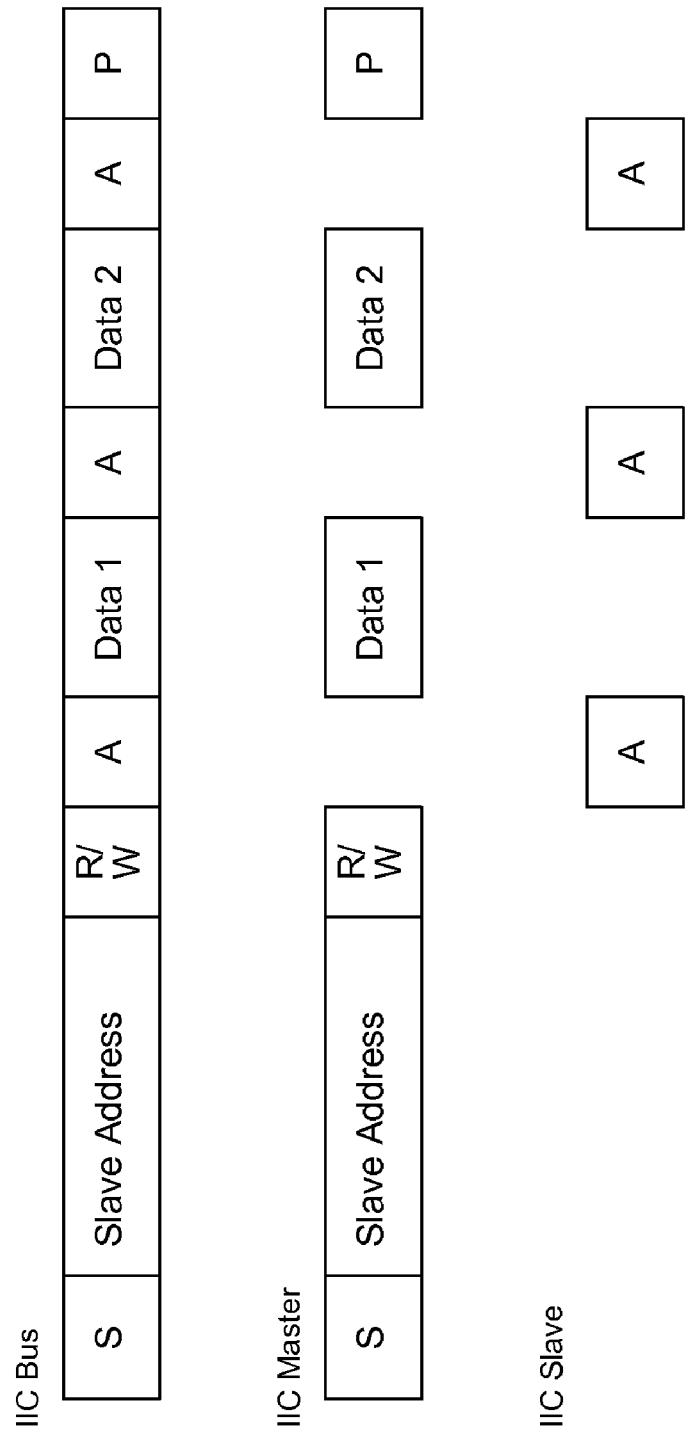
FIG. 11 illustrates the use of a command packet protocol between the agent and the RMM, according to embodiments of the invention.

The command packet protocol is now further described with reference to FIGS. 11 through 13. FIG. 11 illustrates the protocol with a simple transaction on the IIC bus 79. The top track shows what the overall transaction looks like on the IIC bus 79; the middle track shows what the IIC bus master transmits; the bottom track shows what the IIC bus slave transmits. In general, the RMM 41 operates as the IIC bus master and the agent 42 acts as the slave.

In FIGS. 11 through 13, "S" represents a start condition, "P" represents a stop condition, and "A" represents an acknowledgement (ACK). Not shown but potentially used in place of an ACK (A) is "N", which represents a non-acknowledgement (NACK) condition when a transaction fails.

In certain embodiments, the Slave Address field is seven bits representing the combination of a preamble (four bits) and slave device ID (three bits). The device ID bits are typically programmable on the slave device (e.g., via pin strapping). Hence, multiple devices can operate on the same IIC bus. "R/W" represents a read/write bit (e.g., "1" for reads, "0" for writes).

As is well-known, IIC does not provide any mechanism to ensure data integrity. Consequently, certain embodiments of the invention add such a mechanism to the communications between the agent 42 and the RMM 41 on the IIC bus 79. In certain embodiments, this mechanism is provided by following each data byte that goes over the IIC bus 79 (i.e., not the Slave Address, the S/ANN or R/W bits) with its 1's complement. This is shown in FIG. 11, where Data1 represents a data byte and Data2 represents the 1's complement of Data1. The receiving device performs an exclusive-OR (XOR) of each data byte and its 1's complement to validate the byte. A data mismatch or failure to transfer the second byte invalidates the first byte, resulting in the first byte being ignored by receiving device.

To perform a read operation, the RMM 41 issues a special class of Write command, called a Read Setup command, to the agent 42 over the IIC bus 79, to tell the agent 41 what the RMM 42 wants to do next. The RMM 41 then performs a Read operation on the IIC bus 79, to cause the agent 41 to provide the data. FIG. 12 shows the format of a Write packet, according to certain embodiments of the invention. The RAN bit determines whether the packet is a read or write (e.g., "0" for write, "1" for a read), and is therefore shown as a "W" in FIG. 12 to indicate the packet is a Write packet. Each command field, i.e., Cmd1 and Cmd2, is, in certain embodiments, a 16-bit value that specifies the command being transmitted. Command field Cmd2 is the 1's complement of command field Cmd1. The parameter field is an optional field used with certain commands to pass parameter values. In FIG. 12, parameter field Param2 is the 1's complement of parameter field Param1.

FIG. 13 shows the format of a Read packet, according to certain embodiments of the invention. The R/W bit is shown as a "R" in FIG. 13 to indicate the packet is a Read packet. The Data fields, Data1 and Data2, contain the data returned by the agent 42 to the RMM 41, where Data2 is the 1's complement of Data1.

Many different commands may be implemented between the RMM 41 and the agent 42 on the IIC bus 79, depending upon the specific needs of the system. One such command is the Read FIFO command. The Read FIFO command is sent by the RMM 41 over the IIC bus 79 to the agent 42 in response to the agent's assertion of the normal interrupt IRQ, to command the agent 42 to return event data from the FIFO buffer 89. The Read FIFO command is an example of a Read Setup command, which as noted above is actually a special class of Write command. In response to a Read FIFO command, the agent 42 transfers data from the FIFO buffer 89 to the RMM 41 using one or more Read packets. In certain embodiments of the invention, FIFO data is always transferred one event at a time, as follows: an IIC Start ("S"), Slave Address, four data bytes (i.e., FIFO upper data byte and its 1's complement followed by FIFO lower data byte and its 1's complement), IIC Stop ("P"). If no other Read Setup command is issued, a subsequent IIC Read transfer sends the next entry in the FIFO buffer 89 to the RMM 41. FIFO pointers for the FIFO buffer 89 are updated only after the agent 42 has an indication that the transfer has succeeded, as can be determined with IIC error checking. If any of the first three data bytes are NACKed, then the transfer is deemed to have failed, and the FIFO pointers are not updated.

Many other types of commands can be implemented between agent 42 and the RMM 41 on the IIC bus 79 using the above-described command packet protocol. Examples of such commands are commands used to turn the power supplies 38 on or off, to reboot the storage server 20, to read specific registers in the agent 42, and to enable or disable sensors and/or presence detectors. Some of these commands may be recorded by the agent 42 as events in the FIFO buffer 89.

Thus, a method and apparatus for communicating event data between a remote management module and an agent in a processing system have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A processing system comprising:
   control circuitry operable to control the processing system;
   a remote management module including dedicated circuitry configured to allow a remote processing system to manage the processing system via a network;
   a physical agent to operate as an intermediary between the remote management module and the control circuitry, wherein the agent is operable to monitor the processing system to detect a plurality of events in the processing system, the agent includes a buffer and is operable to create an event record in the buffer for each detected event, and the agent is operable to detect a prespecified critical event and to respond to the prespecified critical event by asserting an immediate interrupt to the remote management module; and
   a link coupling the agent to the remote management module, wherein the agent and the remote management module are configured to cooperatively implement an abstraction layer, at least in part by using a command packet protocol to communicate event record data over the link, through which the agent and the remote management module communicate, and the remote management module is operable to receive event record data from the buffer through the abstraction layer in response to an event record being stored in the buffer.

2. A processing system as recited in claim 1, wherein the link is an IIC bus.

3. A processing system as recited in claim 2, wherein the remote management module and the agent implement a data integrity protocol over the IIC bus.

4. A processing system as recited in claim 1, wherein the buffer is a first-in first-out (FIFO) buffer.

5. A processing system as recited in claim 1, wherein:
   the agent is operable to assert an interrupt in connection with detection of an event;
   the remote management module is operable to send a command for the event record data to the agent in response to the interrupt; and
   the agent further is operable to respond to the command by outputting the event record data from the buffer and sending the output event record data to the remote management module over the link.

6. A processing system as recited in claim 1, further comprising a plurality of sensors, wherein each of the plurality of events corresponds to a predetermined condition detected by a corresponding one of the sensors.

7. A processing system as recited in claim 1, further comprising a presence detector to detect the presence or absence of a predetermined component in the processing system, wherein one of the events corresponds to the presence or absence of a predetermined component in the processing system.

8. A processing system as recited in claim 1, wherein each event has a type which is one of a plurality of prespecified event types, each of the prespecified event types having been previously assigned a corresponding unique event type code in the agent and in the remote management module, and wherein the event record of each detected event includes an event type code indicating the type of the detected event and a value representing the detected event.

9. A processing system as recited in claim 8,
   wherein the remote management module receives the immediate interrupt, wherein the immediate interrupt has a prespecified meaning to the remote management module, the remote management module being operable to respond to the immediate interrupt by executing a prespecified response.

10. A server system comprising:
    a network interface through which to communicate with a plurality of network hosts;
    control circuitry operable to control operation of the server system;
    a physical agent capable of monitoring the server system to detect a plurality of events in the server system, the agent including a buffer and operable to store an event record in the buffer for each detected event and to assert an immediate interrupt in connection with detection of a prespecified critical event;
    a remote management module including dedicated circuitry configured to allow a remote processing system to manage the server system via a network, and further to send a command to the agent in response to the interrupt, wherein the agent responds to the command by outputting event record data from the buffer and sending the output event record data to the remote management module; and
    a link coupling the agent to the remote management module, wherein the agent and the remote management module are configured to cooperatively implement an abstraction layer, at least in part by using a command packet protocol to communicate event record data over the link, through which the agent and the remote management module communicate.

11. A server system as recited in claim 10, wherein the link is an IIC bus.

12. A server system as recited in claim 10, wherein the agent provides the event record data output from the buffer to the remote management module via the IIC bus.

13. A server system as recited in claim 12, wherein the remote management module and the agent implement a data integrity protocol over the IIC bus.

14. A server system as recited in claim 10, further comprising a plurality of sensors, wherein at least one of the events corresponds to a predetermined condition detected by a corresponding at least one of the sensors.

15. A server system as recited in claim 14, further comprising a presence detector to detect the presence or absence of a predetermined component in the storage system, wherein one of the events corresponds to the presence or absence of a predetermined component in the storage system.

16. A server system as recited in claim 10,
    wherein the remote management module receives the immediate interrupt, wherein the immediate interrupt has a prespecified meaning to the remote management module, the remote management module being configured to respond to the immediate interrupt by executing a prespecified response.

17. A server system as recited in claim 10, wherein, in response to the interrupt, the remote management module signals the agent to send event record data from the buffer to the remote management module until the interrupt is de-asserted, and wherein the interrupt is de-asserted by the agent only when the buffer is empty.

18. A server system as recited in claim 17, wherein the buffer is a first-in first out (FIFO) buffer.

19. A server system as recited in claim 10, wherein each event has a type which is one of a plurality of prespecified event types, each of the prespecified event types having been previously assigned a corresponding unique event type code in the agent and in the remote management module, and wherein the event record of each detected event includes an event type code indicating the type of the detected event and a value of a monitored signal corresponding to the detected event.

20. A storage server comprising:
   a storage interface through which to access a plurality of mass storage devices;
   a first network interface through which to communicate with a plurality of network hosts;
   control circuitry operable to provide the plurality of network hosts with access to the plurality of mass storage devices;
   a physical agent capable of monitoring the storage server to detect a plurality of events in the storage server, the agent including a buffer and operable to store an event record in the buffer for each detected event and to assert an immediate interrupt in connection with detection of a prespecified critical event;
   a remote management module including dedicated circuitry configured to allow a remote processing system to manage the storage server via a network, and further to send a command to the agent in response to the interrupt, wherein the agent responds to the command by outputting event record data from the buffer and sending the output event record data to the remote management module; and
   a link coupling the agent to the remote management module, wherein the agent and the remote management module are configured to cooperatively implement an abstraction layer, at least in part by using a command packet protocol to communicate event record data over the link, through which the agent and the remote management module communicate.

21. A storage system as recited in claim 20, further comprising a plurality of sensors, wherein at least one of the events corresponds to a predetermined condition detected by a corresponding at least one of the sensors.

22. A storage system as recited in claim 21, further comprising a presence detector to detect the presence or absence of a predetermined component in the storage server, wherein one of the events corresponds to the presence or absence of a predetermined component in the storage server.

23. A storage system as recited in claim 20, wherein the remote management module is coupled to the agent by an IIC link, and wherein the agent provides the event record data dequeued from the FIFO buffer to the remote management module via the IIC link.

24. A storage system as recited in claim 23, wherein the remote management module and the agent communicate with each other over the IIC link using command packets.

25. A storage system as recited in claim 24, wherein the remote management module and the agent implement a data integrity protocol over the IIC link.

26. A storage system as recited in claim 20,
   wherein the remote management module receives the immediate interrupt, wherein the immediate interrupt has a prespecified meaning to the remote management module, the remote management module being configured to respond to the immediate interrupt by executing a prespecified response.

27. A storage system as recited in claim 20, wherein, in response to the interrupt, the remote management module signals the agent to send event record data from the buffer to the remote management module until the interrupt is de-asserted, and wherein the interrupt is de-asserted by the agent only when the buffer is empty.

28. A storage system as recited in claim 27, wherein the buffer is a first-in first out (FIFO) buffer.

29. A storage system as recited in claim 20, wherein each event has a type which is one of a plurality of prespecified event types, each of the prespecified event types having been previously assigned a corresponding unique event type code in the agent and in the remote management module, and wherein the event record of each detected event includes an event type code indicating the type of the detected event and a value of a monitored signal corresponding to the detected event.

30. A method comprising:
   using a physical agent in a processing system to monitor the processing system to detect an event in the processing system;
   using the agent to generate event record data representing the event;
   using the agent to store the event record data in a buffer;
   using the agent to assert an immediate interrupt to a remote management module in connection with detection of a prespecified critical event; and
   using an abstraction layer between the agent and the remote management module in the processing system to communicate the event record data from the agent to the remote management module, the abstraction layer implemented, at least in part, by using a command packet protocol to communicate the event record data over a link between the agent and the remote management module, the remote management module including dedicated circuitry configured to allow a remote processing system to manage the processing system.

31. A method as recited in claim 30, further comprising:
   using a data integrity protocol over the link to communicate the event record data.

32. A method as recited in claim 30, further comprising:
   using the remote management module to send a command for the event record data to the agent in response to the interrupt; and
   using the agent to respond to the command by outputting the event record data from the buffer and sending the output event record data to the remote management module over the link.

33. A method as recited in claim 30, wherein the event corresponds to a predetermined condition detected by a sensor in the processing system.

* * * * *